United States Patent [19]

Gordon et al.

[11] 4,341,393

[45] Jul. 27, 1982

[54] HAND CART

[75] Inventors: Donald J. Gordon, Rockwood; Frank H. Johnson, Cambridge, both of Canada; George L. Schick, Easton, Conn.; J. David Smart, Cambridge, Canada

[73] Assignee: Slater Steel Industries Ltd., Hamilton, Canada

[21] Appl. No.: 12,223

[22] Filed: Feb. 15, 1979

[30] Foreign Application Priority Data

Dec. 18, 1978 [CA] Canada .................................. 318117

[51] Int. Cl.³ .............................................. B62B 1/02
[52] U.S. Cl. .............................. 280/47.26; 280/47.27; 280/47.28; 248/98
[58] Field of Search ............... 280/47.18, 47.26, 47.27, 280/47.28, 47.31; 220/352, 370, 372

[56] References Cited

U.S. PATENT DOCUMENTS

| | | |
|---|---|---|
| D. 175069 | 9/1964 | Gandola. |
| D. 199,053 | 9/1964 | Brighton. |
| D. 200,634 | 3/1965 | Raye. |
| D. 201,547 | 7/1965 | Krueger. |
| D. 222,243 | 10/1971 | Young. |
| 867,754 | 10/1907 | Randall. |
| 957,406 | 5/1910 | Bjorklund ......................... 280/47.18 |
| 957,840 | 5/1910 | Bjorklund ......................... 280/47.27 |
| 1,150,964 | 8/1915 | Phelps .............................. 280/47.28 |
| 1,319,530 | 10/1919 | Nies. |
| 1,475,785 | 11/1923 | Bergstrom ........................ 280/47.18 |
| 1,679,325 | 7/1928 | Black. |
| 1,953,880 | 4/1934 | Gomes .............................. 280/47.27 |
| 1,969,457 | 8/1934 | Forrer .............................. 280/47.31 |
| 2,475,278 | 7/1949 | Coakley. |
| 2,742,300 | 4/1956 | Carver .............................. 280/47.31 |
| 2,789,829 | 4/1957 | Parker. |
| 2,797,125 | 6/1957 | Vogler. |
| 2,869,886 | 1/1959 | Wardell. |
| 2,938,734 | 5/1960 | Gulmond. |
| 2,949,314 | 8/1960 | Strohmaier ....................... 280/47.28 |
| 3,104,890 | 9/1963 | Hill. |
| 3,193,123 | 7/1965 | Wouden ........................... 280/47.27 |
| 3,350,797 | 11/1967 | Dassinger. |
| 3,358,872 | 12/1967 | Johnson ............................ 220/370 |
| 3,391,847 | 7/1968 | Christine .......................... 220/352 |
| 3,698,736 | 10/1972 | Shape ............................... 280/47.18 |
| 3,706,461 | 12/1972 | Devol. |
| 3,718,337 | 2/1973 | Vosbikian. |
| 3,746,360 | 7/1973 | Crawford ......................... 280/47.27 |
| 3,751,058 | 8/1973 | Larsen. |
| 3,888,501 | 6/1975 | McChesney ..................... 280/47.18 |
| 3,913,780 | 10/1975 | Holbrook ......................... 220/352 |
| 3,927,898 | 12/1975 | Weyrauch ........................ 280/47.27 |
| 3,950,004 | 4/1976 | Olsson ............................. 280/47.18 |
| 4,136,889 | 1/1979 | Middleton ........................ 280/47.18 |

FOREIGN PATENT DOCUMENTS

| | | |
|---|---|---|
| 192248 | 8/1919 | Canada. |
| 41422 | 3/1976 | Canada. |
| 703231 | of 0000 | Canada. |
| 921065 | of 0000 | Canada. |
| 62510 | 3/1926 | Sweden ............................ 280/77.18 |

OTHER PUBLICATIONS

"Canada Cart", (Slater Products Data Sheet).
"Country Estate", Garden Cart advertisement, 11-1978.
"Garden Way" Cart.
"Vermont-Ware" Cart.
"Stow-,A-Way" Cart, 3-1978
"Ballbarrow".

Primary Examiner—Robert R. Song
Attorney, Agent, or Firm—Burgess, Ryan & Wayne

[57] ABSTRACT

A hand cart comprises a truck and an upwardly open container mounted on the truck. The truck has an elongate frame provided at one end thereof with a handle and at the opposite end thereof with a nose, against which the container abuts with projections on the front of the container engaging in openings at the base of the nose, and a manually actuable clip or the like is provided for releasably securing the rear of the container to the frame. With the container attached to the frame, the cart can be used as a wheelbarrow and, with the container removed, the truck can be used by itself. A detachable nose extension and a detachable bag support are disclosed and the truck can be disassembled for flat packaging.

7 Claims, 11 Drawing Figures

HAND CART

The present invention relates to hand carts and trucks and also to bag supports and is useful, in particular, but not exclusively, domestically, i.e. in domestic yards and gardens.

The prior art includes numerous different types of hand carts, including hand trucks and wheelbarrows.

The conventional prior art hand truck or dolly, which is useful for carrying case goods, boxes, bags and the like, comprises an elongate frame provided at one end thereof with a pair of handles and, adjacent its opposite end, with a nose, the frame being mounted on a pair of ground engagement wheels and the nose being arranged so that, when the frame is tilted relative to the wheels to lower the nose onto the ground, the nose extends approximately parallel to the ground to support the hand truck in an approximately upright position and also to facilitate the positioning of articles to be carried onto the hand truck.

Another well known type of prior art hand cart is the wheelbarrow, which is conventionally provided with a single wheel below the front end of an open topped container, with a pair of handles projecting rearwardly from the wheelbarrow and a pair of ground engagement legs extending downwardly from the rear of the container for supporting the container.

In addition, various proposals have been made in the past to provide hand carts and trucks having removable parts to allow use of the hand carts for different purposes.

For example, Canadian Pat. No. 192,248 has a hand cart comprising a frame supported on a single wheel, a receptacle in the form of an upwardly open container which is releasably securable on the frame, and an agricultural implement which is also releasably securable to the frame. On removal of the receptacle and attachment of the agricultural implement, this prior hand cart is converted for use, for example, as a cultivator. However, this prior proposal does not enable the wheeled frame to be employed, in any convenient manner, for carrying articles when the receptacle is removed.

Canadian Pat. No. 120,245 discloses a barrel truck comprising a wheeled frame and a receptacle releasably attachable to the frame in such a manner that, when the frame is tilted to lower the front of the frame onto the ground, the front of the receptacle is spaced upwardly from the ground. Consequently, the loading of articles into the receptacle in this position requires that the articles be lifted into the receptacle.

It is an object of the present invention to provide a novel and improved hand cart which comprises a hand truck and a container releasably securable to the hand truck and which facilitates loading of the container.

According to the present invention, there is provided a hand cart comprising a hand truck having an elongate frame provided at one end thereof with handle means and at the opposite end thereof with a truck nose; the elongate frame being mounted on a pair of wheels; an upwardly open container mounted on the truck; and means for releasably securing the upwardly open container on the frame, the upwardly open container having an upwardly and forwardly inclined front wall adjacent and at least approximately parallel to the nose to facilitate loading of the upwardly open container when the truck is tilted to lower the front wall onto the ground.

Preferably, the depth of the upwardly open container increases from the rear to the front thereof, and the upwardly open container is positioned above the wheels so that, when the container is loaded, the hand cart and its load are balanced over the wheels in such a way as to reduce the effort which needs to be expended by the user of the hand cart in supporting the load and the hand cart on the wheels.

The upwardly open container may comprise a one-piece moulding of plastics material.

Various attachments may be provided for the hand cart. For example, the truck may be provided with a nose extension in the form of a U-shaped member, the truck being formed, e.g. at the bottom of the nose with a pair of openings for releasably receiving the free ends of the U-shaped member.

The present invention further provides a hand truck comprising a pair of opposed longitudinal truck side portions; transverse members extending between the side portions; a truck nose extending between opposed front ends of the side portions; handle portions extending rearwardly from opposed rear ends of the side portions; a pair of wheels mounted on the side portions, respectively; and means for releasably connecting the handle portions, the transverse members and the nose to the side portions, whereby the truck can be disassembled for flat packaging by disconnection of the handle portions, the transverse members and the nose from the side portions.

The present invention still further provides a bag support, comprising a bag engagement member for engagement around a portion of a bag adjacent the mouth of the bag, the bag engagement member extending around at least a major portion of an opening defined thereby and having a narrow cross-section; means for supporting the bag engagement member; and bag retainer means for retaining the bag portion in a wrapped condition around the bag engagement member; the bag retainer means defining a recess for receiving the bag engagement member therein with the bag portion between the bag engagement member and the bag retainer means.

The invention will be more readily understood from the following description of a preferred embodiment thereof given, by way of example, with reference to the accompanying drawings, in which.

Figure 1:
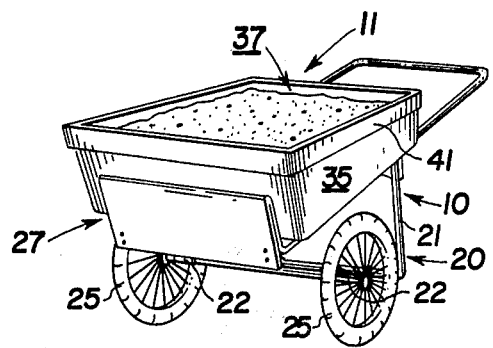
FIG. 1 shows a view in perspective of a hand cart embodying the present invention.
Figure 3:
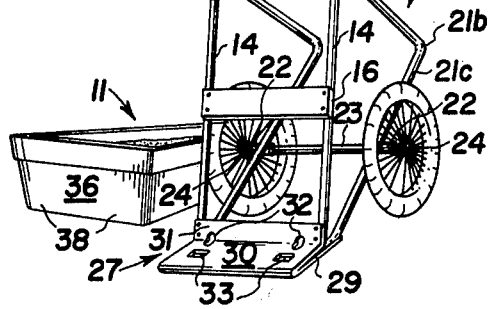
FIG. 3 shows a view in perspective of the truck and the container of the hand cart of FIG. 1 separated from one another.

Referring firstly to FIGS. 1 and 3, the present hand cart comprises two basic parts, namely a hand truck indicated generally by reference numeral 10 and an upwardly open container indicated generally by reference numeral 11.

The truck 10 comprises a frame indicated generally by reference numeral 12, which is formed by a pair of parallel side portions each comprising a longitudinal tubular longitudinal side member or arm 14, a handle 15 extending between and connecting the arms 14 at the rear end of the dolly 10 and a pair of transverse members 16 and 17 which are secured at opposite ends thereof to the arms 14. The transverse members 16 and 17 are formed of sheet metal and, as can be seen from FIG. 6, the transverse member 17 has a downwardly extending rear portion 19.

Figure 6:
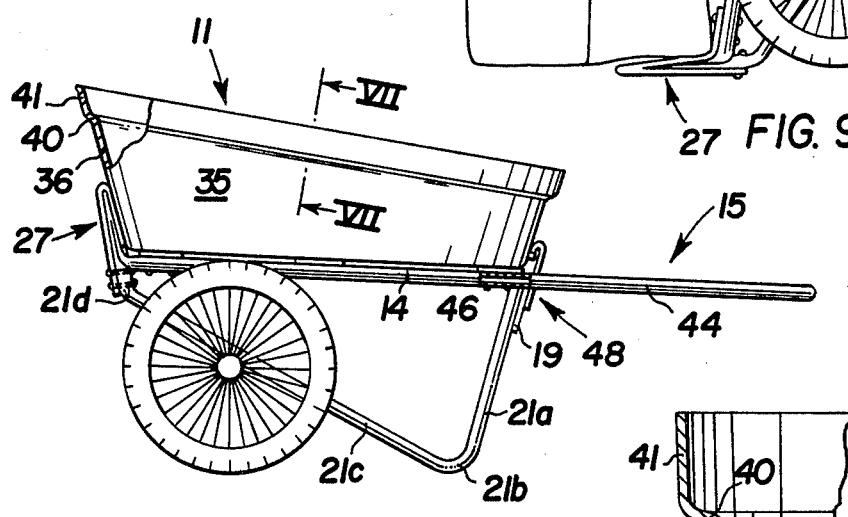
FIG. 6 shows a view in side elevation of the hand cart of FIG. 1.

A pair of support legs indicated generally by reference numeral 20 are formed by two tubular side members which are respectively secured to the arms 14 and which are each bent, as shown more clearly in FIG. 6, to form a rear section 21a, which extends downwardly from the rear of the respective arm 14, a ground engagement section 21b in the form of an elbow, and a front section 21c which is downwardly and rearwardly inclined, with a bend 21d therein, from the front of the respective arm 14, to the ground engagement section 21b. An axle 23 is releasably mounted in horizontally aligned bushings 22 secured as by welding to the front sections 21c and a pair of wheels 25 are removably mounted on bearings 24 on opposite ends of the axle 23. As can be seen from the drawings, axle 23 is located intermediate ground engagement section 21b and bend 21d and at a substantial distance from each.

The front end of the support frame 12 is provided with a nose indicated generally by reference numeral 27, which like the transverse members 16 and 17 is releasably secured at opposite ends thereof by bolts to the arms 14. The nose 27 is formed of sheet metal, which is bent at the forward portion to form an outer front or ground-engaging wall 29 and a rear or support wall 30. At the bottom of the support wall 30, the sheet metal of the nose is bent to form a rear edge portion 31, which extends transversely across the front ends of the frame arms 14.

At its base, where the support wall 30 meets the edge portion 31, two openings 32 are formed in the nose 27 for the purpose described hereinafter.

The upwardly open container 11 is formed in one piece of vacuum formed plastics material and has a substantially flat bottom 34, opposed side walls 35, a front wall 36 and a rear wall 37.

The front wall 36 is provided, on its front surface, with a horizontally spaced pair of brackets 38, the spacing of which corresponds to the spacing of the openings 33 in the rear wall 30 of the nose 27. The brackets 38 are releasably engageable with the support wall 30 of the nose 27 by insertion of the brackets 38 into the openings 33 when the upwardly open container 11 is mounted on the frame 12. In this way, the front wall 36 of the upwardly open container 11 is releasably anchored or secured to the nose 27.

Figure 7:
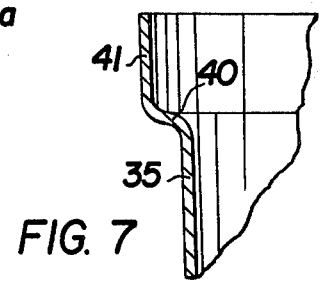
FIG. 7 shows a broken-away view in cross-section through the container taken along the line VII—VII of FIG. 6.

As can be seen from FIGS. 6 and 7, the walls 35 to 37 of the upwardly open container 11 are each formed with an outwardly extending shoulder 40 and a wall extension 41 extending upwardly from the shoulder 40 and outwardly offset from the respective wall. The wall extensions 41 form the upper edge of the upwardly open container 11 and facilitate manual gripping of the upwardly open container 11 when it is required to lift the latter. In addition, the provision of the shoulder 40, extending around the periphery of the upper portion of the walls of the container 11, reinforces these walls.

Figure 2:
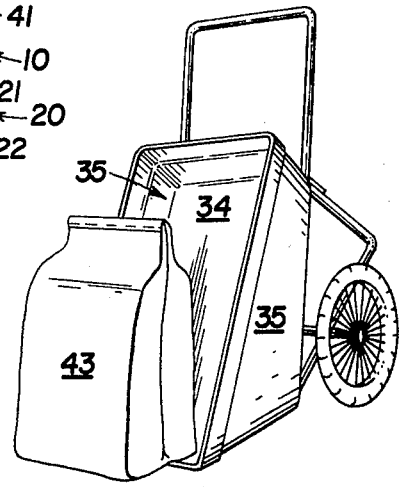
FIG. 2 shows a view in perspective of the hand cart of FIG. 1 in a tilted position.

Also, the front wall 36 of the container 11 abuts the nose 27 and is at least approximately parallel thereto, the wall 36 projecting upwardly beyond the nose 27 when the hand cart is in the position shown in FIG. 6. Furthermore, as can be seen from FIG. 6, the shoulder 40 projects forwardly of the wall 36 so as to offset the wall extension forwardly by a small amount, and consequently the wall extension 41 of the front wall 36 lies at least approximately in alignment with the nose 27. As a consequence of this alignment and of the fact that the wall 36 extends approximately parallel to the nose 27, the front of the container will come to lie on the ground, and approximately parallel thereto, when the hand truck is tilted into the position shown in FIG. 2 to lower the nose 27 onto the ground. In this way, the loading of heavy articles, such as a bag 43 shown in FIG. 2, or the shoveling of soil or the raking of leaves or the like into the container 11 is considerably facilitated.

The container 11 is disposed relative to the axle 23 such that the centre of gravity of the hand truck 10, the container 11 and the contents of the container 11 lies at least substantially vertically above the axle 23 in order to minimize the lifting force which needs to be exerted by the user of the hand cart on the handle 15 for raising the ground engagement or support legs 20 from the ground when it is desired to wheel the hand cart.

The handle 15 is formed in one piece of a tubular member which is bent to form two parallel side portions or arms 44 connected by a straight, transverse intermediate portion 45 to form a generally U-shaped handle. Each arm 44 has an end portion 46 which is of reduced diameter and which is telescopically and releasably engageable in the rear end of the respective frame side portion or arm 14, as shown in FIG. 6. The reduced diameter end portions 46 are conveniently formed by swaging the ends of the handle 15.

The transverse members 16 and 17 and the nose 27 are readily releasably secured by bolts to the arms 14 and the support leg front sections 21c of the frame 12 and, in conjunction with the axle 23, releasably connect together two side portions of the frame 12, each of these side portions comprising one of the arms 14 and one of the support legs 20, which is welded at opposite ends thereof to the respective arm 14.

Consequently, the frame 12 can be dismantled or disassembled by pulling the handle 15 rearwardly out of the arms 14, removing the wheels 25 and their axle 23 and unbolting the transverse members 16 and 17 and the nose 27 from the frame side portions. When thus disassembled, the frame 12 can be packaged flat for transportation and storage.

In order to simplify manufacture thereof, the two side portions of the frame are identical.

The wheels 25 are preferably bicycle wheels of sixteen inch diameter for lightness and economy, but of course any other suitable wheel may be substituted therefor.

For securing the rear end of the container 11 to the frame 12, a quick-acting manually operable catch 48 is mounted on the rear portion 19 of the transverse member 17 and cooperates with a bracket 75 provided on the rear wall 37 of the container 11. The catch 48 is a commercially available fastener marketed under the trade name "Link-Lock" by Simmons Fastener Corporation, of Albany, N.Y., but it will be appreciated that any other suitable, readily engageable and disengageable, manually actuatable catch or securing means may be provided.

With the container 11 removed, as shown in FIG. 3, the hand truck 10 can be used by itself for carrying boxes, cases, luggage or the like, i.e. as a conventional hand truck or dolly.

Figure 4:
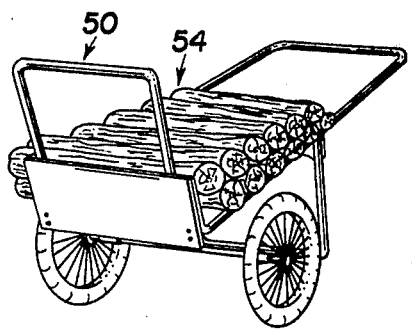
FIG. 4 shows a view in perspective of the truck in use with a nose extension.
Figure 5:
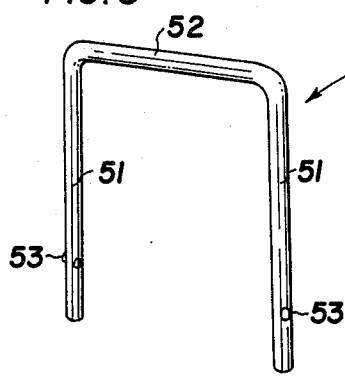
FIG. 5 shows a view in perspective of the nose extension shown in FIG. 4.

If it is desired to increase the carrying capacity of the hand truck 10, then the latter may be provided with a nose extension which is indicated generally by reference numeral 50 in FIGS. 4 and 5.

The nose extension 50, which is formed as a bent tubular member, is of generally U-shape, with a pair of parallel arms 51 connected by an intermediate transverse portion 52.

The free ends of the arms 51 are insertable into the openings 32 (FIG. 3) in the nose 27 of the hand truck 10. In order to limit the extent to which the arms 51 can be inserted into the openings 32, the arms 51 are formed with projections 53, e.g. by pressing outwardly a portion of the wall of each arm 51, and these projections 53 abut the edge portion 31 of the nose when the nose extension 50 is inserted into the openings 32.

As will be readily apparent from FIG. 4, one use of the nose 50 is for retaining logs, indicated generally by reference numeral 54, on the hand cart.

Figure 8:
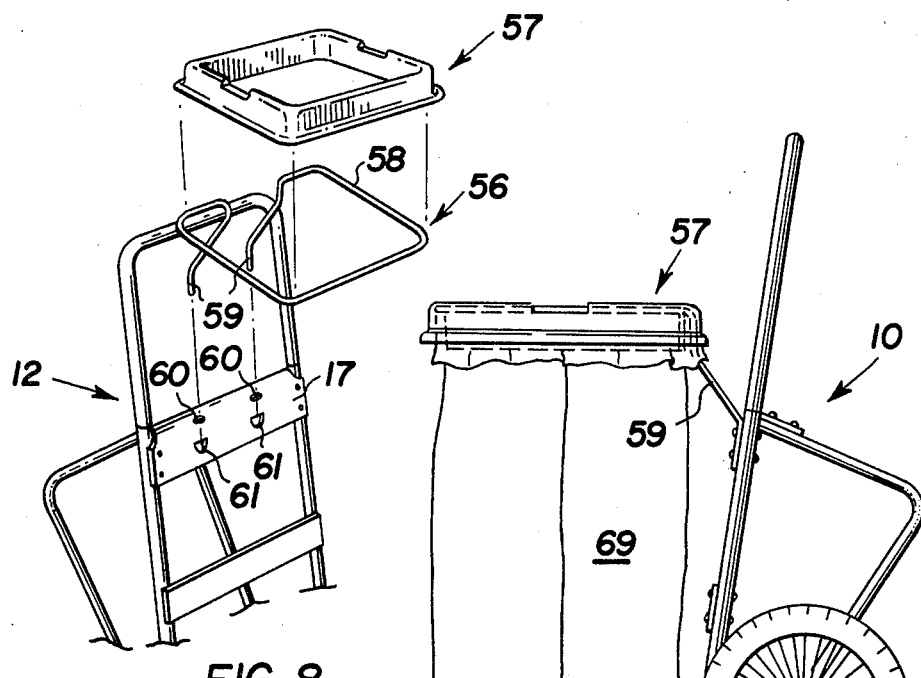
FIG. 8 shows a broken-away exploded view in perspective of part of the hand truck of FIG. 1 provided with a bag support.
Figure 9:
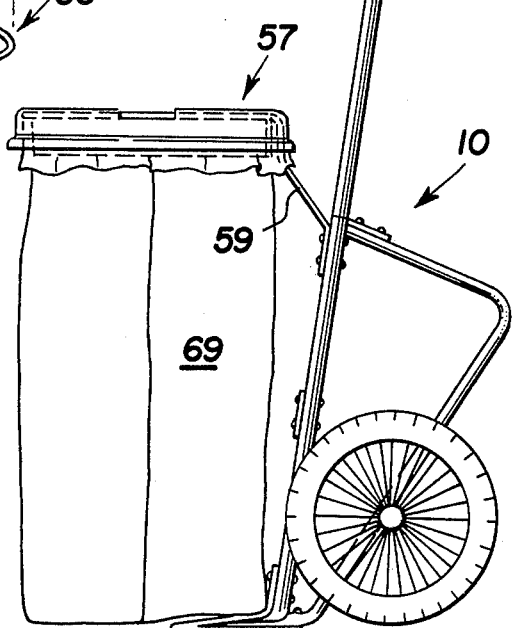
FIG. 9 shows a view in side elevation of the hand truck of FIG. 1 with a bag attached to the bag support shown in FIG. 8.

FIGS. 8 and 9 illustrate another attachment for use with the hand truck 10 and, more particularly, show a removable bag support for releasable attachment to the transverse member 17.

The bag support comprises a bag engagement member, indicated generally by reference numeral 56, and a bag retainer, indicated generally by reference numeral 57, of plastics material.

The bag engagement member 56 comprises a length of wire bent to form a hoop or frame 58 provided with a pair of rearwardly and downwardly extending support legs 59 formed by the free ends of the wire.

The legs 59 are engageable in respective openings 60 in the transverse member 17, and a pair of pockets 61 are pressed into the transverse member 17 for receiving the lowermost ends of the support legs 59, the pockets 61 having top openings in alignment with the openings 60, and the latter are formed at the top of the downwardly extending rear portion 19 of the transverse member.

Figure 10:
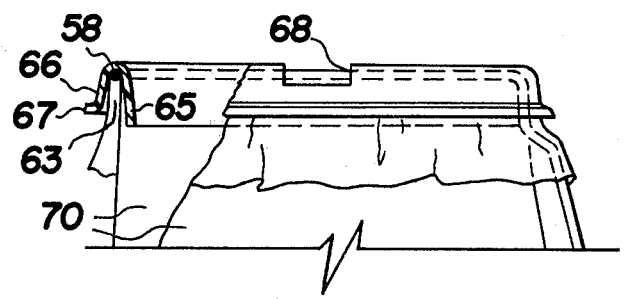
FIG. 10 shows a broken-away view of parts of the bag support of FIG. 8, shown partly in cross-section.

The bag engagement member 58 defines a substantially square opening therein, and the bag retainer 57 is formed with a recess 63 at the underside thereof, as shown in FIG. 10, for receiving the bag engagement member 58. The bag retainer 57 also defines a substantially square opening and comprises an inner wall 65 merging with an outer wall 66 at the top of the bag retainer 57, the outer wall 66 being formed with an outwardly projecting rim 67 at its lower edge.

A pair of cutouts 68 (See FIG. 10) are formed in the top of the bag retainer 57 on opposite sides thereof.

When the bag support is in use, the ends of the legs 59 are inserted through the openings 60 and seated in the pockets 61.

A plastics bag 69 is then arranged, as shown in FIGS. 9 and 10, with an upper portion of the bag 69 extending through the opening defined by the bag retainer 58 and folded or wrapped outwardly over the latter. The bag retainer 57 is then pressed downwardly onto the bag engagement member into the position in which it is shown in FIGS. 9 and 10 and serves to retain the top of the bag in an open condition on the bag engagement member 58.

With the bag 69 thus installed, the hand truck 10 is useful for leaf collection, garbage collection etc.

When it is required to remove the bag, the rim 57 may be conveniently gripped by the fingers, while the thumbs press downwardly onto the bag engagement member 58 at the cutouts 68 so as to force the bag engagement member 58, which is preferably retained in the bag retainer 57 by the resiliency of the latter, from the bag retainer 57, which is then lifted.

As will be readily appreciated, a mounting bracket (not shown) having openings corresponding to the openings 60 may be provided for attachment, for example to a wall, for holding the bag engagement member 58 when it is desired to retain the bag 69 in its open condition without using the hand truck 10.

Figure 11:
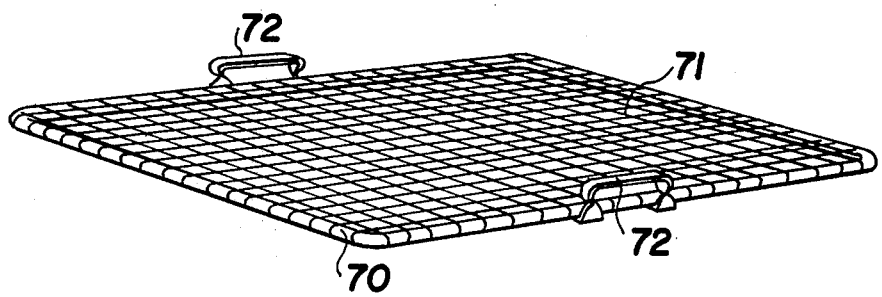
FIG. 11 shows a view in perspective of a screen for use with the container of FIG. 1.

FIG. 11 shows a screen adapted to fit into the top of the upwardly open container 11. This screen has a rectangular frame 70 covered by wire mesh 71 and provided, at opposite sides thereof, with a pair of handles 72. The frame 70 is dimensioned so that the screen can be inserted into the top of the upwardly open container 11 with the frame 70 seated on the shoulder 40, and the screen can then be used, for example, for screening earth shoveled thereon, the earth falling through onto the bottom of the upwardly open container 11 and rocks, twigs and the like being retained by the screen 70.

We claim:

1. A hand cart, comprising:
   (A) a truck which comprises a pair of elongate straight side frame members; a plurality of transverse members connected between said side frame members; a handle connected to the rear ends of said side frame members; a truck nose connected to the front ends of said frame members; an elongate ground engaging frame member connected to each of said side frame members, said ground engaging member including a rear section extending downwardly from said rear end, a ground engaging section in the form of an elbow, and a front section extending upwardly and forwardly from said ground engaging section to said front end; an axle connected between said front sections intermediate, and at a substantial distance from, said ground engaging sections and said front end; and a pair of wheels mounted on said axle;
   (B) an upwardly open container having front, rear, and side walls mounted on said truck, positioned above said wheels and disposed relative to the axle such that the center of gravity of the truck, the container, and the contents of the container lies substantially vertically above the axle in order to minimize the lifting force which needs to be exerted by the user of the hand cart on the handle for raising the ground engaging members from the ground when it is desired to wheel the hand cart;
   (C) the depth of said container increasing from the rear to the front thereof, said front wall being upwardly and forwardly inclined and disposed adjacent and at least approximately parallel to said nose to facilitate loading of said upwardly open container when said truck is tilted to lower said front wall onto the ground; and (D) means for releasably securing said upwardly open container on said frame, said securing means including a pair of projections on the front wall of said upwardly open container, said projections being releasably engageable in openings in said nose for retaining said upwardly open container on said truck, and quick-acting manually operable catch means on the upper portion of said truck for releasably engaging the rear wall of said upwardly open container.

2. A hand cart as claimed in claim 1, wherein said upwardly open container comprises a one-piece plastic moulding.

3. A hand cart as claimed in claim 2 or 1, wherein each wall of said container is formed with an outwardly extending shoulder and a wall extension extending upwardly from the shoulder and outwardly offset from the respective wall, the wall extensions forming an upper edge of said upwardly open container.

4. A hand cart as claimed in claim 3, further comprising a wire mesh screen removably mountable on said shoulders within said wall extension.

5. A hand cart as claimed in claim 2 or 1, further comprising a nose extension in the form of a U-shaped member, said nose being formed with a pair of openings for releasably receiving the free ends of said U-shaped member.

6. A hand cart as claimed in claim 1, wherein said handle is generally U-shaped with two parallel opposite side arms connected at one end by an intermediate portion, the other ends of said side arms being telescopically engaged in said frame side portions.

7. A hand cart as claimed in claim 1, wherein said transverse members, said handle, said truck nose, said axle, and said wheels are releasably connected to the respective members, to thereby provide for easy assembly and disassembly.

* * * * *